United States Patent
Lepage et al.

[19]

[11] Patent Number: 5,871,218
[45] Date of Patent: Feb. 16, 1999

[54] SWIVEL WHEEL ANTI-WOBBLING DEVICE FOR CART

[76] Inventors: Jean-Paul Lepage, 152, rang d'Argenteuil, Saint-Damase, Québec, Canada, J0H 1J0; Robert Lepage, 332, Pierre Côté, Bois-des-Filion, Québec, Canada, J6Z 4A2

[21] Appl. No.: 705,641

[22] Filed: Aug. 30, 1996

Related U.S. Application Data

[63] Continuation of Ser. No. 383,646, Feb. 6, 1995, abandoned.

[51] Int. Cl.[6] ........................................... B62B 3/14
[52] U.S. Cl. ........................ 280/33.992; 280/124.111
[58] Field of Search ........................ 280/33.992, 111, 280/112.1, 33.991, 690, 719, 724, 124.111

[56] References Cited

U.S. PATENT DOCUMENTS

| | | | |
|---|---|---|---|
| 1,120,036 | 12/1914 | Dearing | 280/112.1 |
| 1,620,323 | 3/1927 | Bugatti | 280/112.1 |
| 2,417,019 | 3/1947 | Sherman | 280/112.1 |
| 2,903,273 | 9/1959 | Hennion | 280/33.991 X |
| 4,159,749 | 7/1979 | Boushek, Jr. | 280/111 X |
| 4,434,991 | 3/1984 | Winterton | 280/111 X |
| 4,688,812 | 8/1987 | Everard | 180/65.1 X |

*Primary Examiner*—Brian L. Johnson
*Assistant Examiner*—Michael Mar
*Attorney, Agent, or Firm*—Swabey Ogilvy Renault

[57] ABSTRACT

A suspension device for preventing swivel wheel wobbling over uneven terrain of a cart, such as a shopping cart, equipped with a pair of laterally opposite swivel wheels. The suspension device consists of a rigid elongated cross-member, fixedly mounted to the cart frame; an elongated arm, defining first and second opposite ends; a first mount, for mounting the arm to the cross-member for relative movement thereabout, whereby the arm first and second ends are movable relative to the ground in opposite directions. Stoppers restrain relative movement of the arm first and second ends within a prescribed play. A second mount rotatably mounts the two swivel wheels to corresponding opposite ends of the elongated arm, wherein the relative movement of the arm is responsive to ground terrain irregularities.

9 Claims, 6 Drawing Sheets

FIG. 6

SWIVEL WHEEL ANTI-WOBBLING DEVICE FOR CART

CROSS-REFERENCE

This application is a Continuation of U.S. Ser. No. 08/383,646 filed Feb. 6, 1995, now abandoned.

FIELD OF THE INVENTION

This invention relates to the swivel wheel mounts of carts such as conventional basket carts used when shopping in grocery stores.

BACKGROUND OF THE INVENTION

A shopping cart is conventionally supported by a pair of fixed rear wheels and a pair of front swivel mounted wheels. These front directional swivel wheels are usually simply mounted to the cart underframe, without any suspension, since these carts should have the lowest manufacturing cost possible in view of the fact that they are leased free of charge to the customer during his/her stay into the grocery store. One problem encountered with these carts is the so-called "wobbling" of one of the swivel wheels or casters, when this wheel of the cart engages uneven terrain, or alternately, when the shopping cart underframe is slightly bent. A wobbling effect occurs because one of the swivel wheels becomes raised off the ground and may start to rotate or oscillate about its vertical axis. Once the raised swivel wheel resumes its ground engaging condition, it may have become transverse to the direction of travel of the shopping cart, thus creating a braking effect. The grocery items in the food basket supported by the shopping cart frame can thus be accidentally brought to roll or fall into the basket, thus undesirably damaging those groceries that are fragile (fruits, eggs, . . . ).

Figures 3, 4:
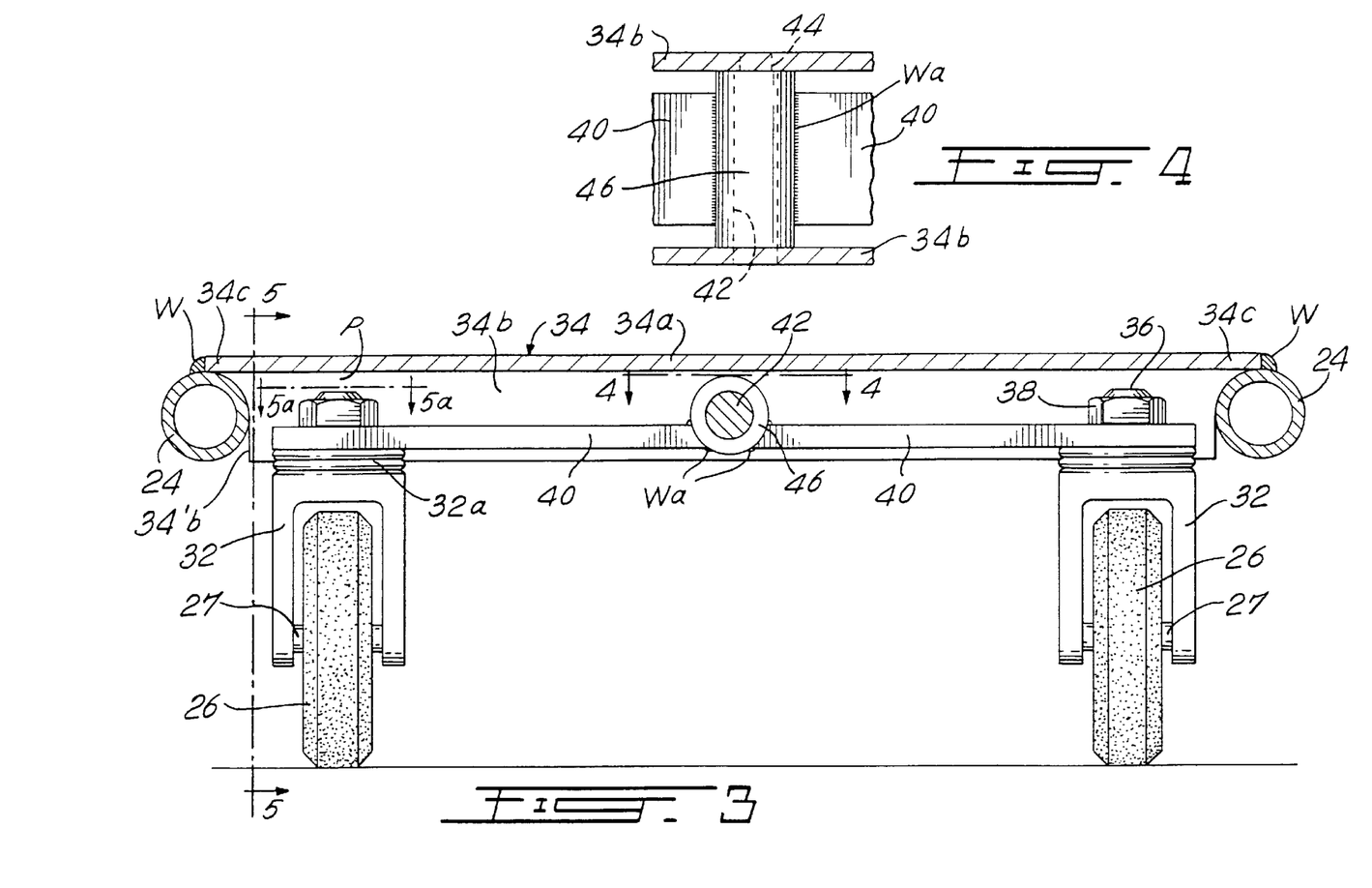
FIG. 3 is a vertical sectional view of the elements of FIG. 1, but at an enlarged scale and with the shopping cart underframe and the front swivel wheels being illustrated in full lines.
FIG. 4 is a top plan section showing the pivotable sleeve and taken along line 4—4 of FIG. 3.

An initial attempt to address this swivel wheel wobbling problem at a low cost appears in U.S. Pat. No. 2,903,273 issued in September 1959 to the Tyler Refrigeration corp. In the Tyler patent, the front swivel wheels of the shopping cart are connected to a shopping cart cross-frame by a leaf-spring member 37 that allows the swivel mounted wheels 34, 30 to move upwardly and downwardly relative to the cart frame 13 under load. More particularly, and as illustrated in FIG. 3 of the Tyler patent, the elongated bell-shaped leaf spring 37 is anchored at its intermediate upper section to the cross-member 40 by pins 38, while its two opposite lower ends carry the two corresponding wheels 34. Although wheel wobbling with such a suspension is less likely, a new—and greater—problem is created, namely: an increased danger of lateral overturning. Indeed, the leaf spring 37 would tend to exacerbate any initial lateral tilt accidentally brought upon when the shopping cart is brought to a tight curve by the shopper, and thus possibly bring the whole basket 11 to fall laterally and strike ground along its side wall. Other carts, similar to shopping carts, often have a swivel wheel wobbling problem.

OBJECTS OF THE INVENTION

The main object of the invention is therefore to address the problem of swivel wheel wobbling of carts such as shopping carts, without creating an adverse problem of lateral instability of the whole cart.

A corollary object of the invention is to provide an anti-swivel wheel wobbling system for a shopping cart, which will be of low manufacturing cost and of high reliability.

A general object of the invention is to reduce grocery stores foodstuff losses from improper handling of foodstuff carrying shopping carts.

SUMMARY OF THE INVENTION

In accordance with the objects of the invention, there is disclosed a suspension device for preventing swivel wheel wobbling of a cart over uneven terrain, said cart of the type including a rigid underframe to be directionally carried over ground by a pair of laterally opposite swivel wheels, said suspension device consisting of:

a rigid elongated cross-member, to be fixedly mounted to said cart frame;

an elongated arm member, defining first and second opposite ends;

first mounting means mounting said arm member underneath and in alignment with to said cross-member for relative movement thereabout of said first and second ends thereof;

limit means, to restrain within a prescribed play said relative movement of said arm member first and second ends, whereby lateral stability of the cart is not compromised; and—second mounting means, for rotatably mounting the two swivel wheels to corresponding said opposite first and second ends of said elongated arm member; wherein said relative movement of the arm member first and second ends is responsive to terrain irregularities, to keep both swivel wheels in constant contact with ground.

In a first embodiment of the invention, said cross-member includes a full web and two opposite downturned flanges, and said first mounting means includes a shaft, joining said cross-member flanges and extending beneath said web spacedly therefrom, and a sleeve member, rotatably mounted around said shaft and fixedly anchored to an intermediate section of said elongated arm member whereby said swivel wheels are concurrently movable in opposite directions under translational motion around said shaft, both said arm member opposite ends spacedly clearing said cross-member web upon said arm member extending generally parallel to said cross-member web. Said elongated arm member is preferably anchored to said sleeve member about the sleeve member tangential lowermost section.

Said limit means could further include first and second stopper members, integrally mounted to corresponding said arm member first and second ends at a location opposite said swivel wheels, and abuttingly engageable with said cross-member web in alternating fashion upon said vertical motion of the swivel wheels produced by uneven terrain.

According to a second embodiment of the invention, said elongated arm member could consist of a pair of elongated lever arms each defining an outer end and an opposite inner end; said cross-member including a full web and two opposite downturned flanges; said first mounting means including a shaft, joining said cross-member flanges beneath said web spacedly therefrom, and a hinge member, rotatably mounted around said shaft and defining first and second hinge parts fixedly mounted to corresponding first and second said lever arms inner ends whereby each said lever arm is freely movable relative to the other said lever arm, said swivel wheels thus being able to enter into independent vertical motion round said shaft, the outer ends of said lever arms further including corresponding first and second abutment members at a location opposite the corresponding said swivel wheels, both said abutment members, in an upper limit position of said lever arms, continuously abuttingly engaging said cross-member web under load from the cart over even terrain; and further including biasing means, biasing each said half arm away from said cross-member web, and said limit means includes a second pair of stopper means carried by said web and spacedly extending under said lever arms when in said upper limit position.

These biasing means could consist of either of the following two embodiments:

(a) a pair of coil springs, extending between said cross-member web and the corresponding first and second lever arms at a location proximate the corresponding said outer ends thereof, and means to maintain such positioning of said coil springs between said cross-member web and said lever arms; or (b) a leaf spring member, extending between said cross-member web and the corresponding lever arms, said leaf spring member defining two opposite end portions located proximate the corresponding outer ends of said lever arms and engaging same, and a central section engaging the underface of said cross-member web. Said leaf spring member could further include tongue elements, downwardly projecting from said central section thereof and engaging said hinge member, said tongue elements for preventing accidental sliding motion of said leaf spring member lengthwisely along the corresponding said lever arms.

Preferably, said limit means consists of rigid stopper lips, edgewisely inwardly carried by one of said cross-member flanges and extending beneath said cross-member web and transversely engageable by a corresponding lever arm in a lowered limit position of the corresponding lever arm.

DETAILED DESCRIPTION OF THE DRAWINGS

Figure 5:
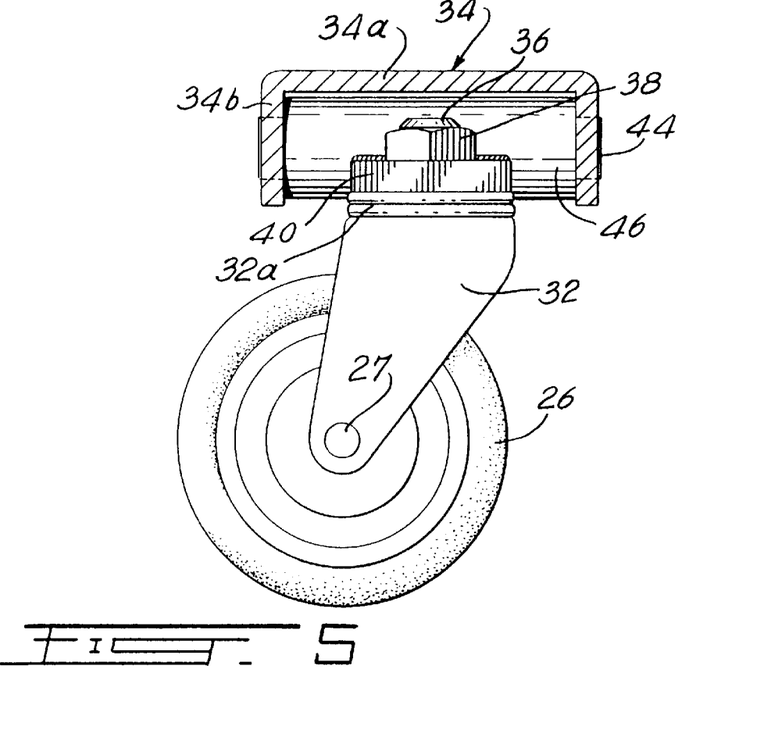
FIG. 5 is a cross-sectional elevation taken along line 5—5 of FIG. 3.
Figure 5A:
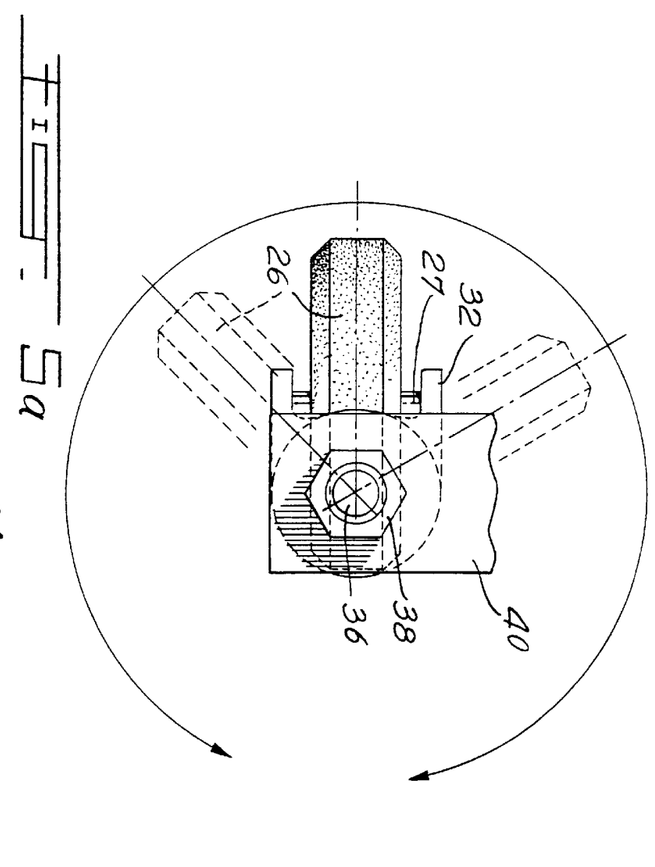
FIG. 5a is a top plan of a swivel wheel and of an end of the pivotal arm.

Shopping cart 20 conventionally consists of a tubular frame 22, supporting a large upper basket and carried over ground by wheels. The usual layout of the wheels includes a horizontal U-shape underframe defining two side legs 24 and a front web 24a. A pair of front wheels 26 and a pair of rear wheels 28 are rotatably carried to the shopping cart underframe beneath the opposite ends of the corresponding side legs 24. The rear wheels 28 are usually "fixed", i.e. their supporting yokes 30 are fixedly anchored to the frame legs 24 whereby the rear wheels 28 cannot rotate about a vertical axis; while the front wheels 26 are swivel-mounted, i.e. their supporting yokes 32 are mounted to the frame 22 for free rotation about a vertical axis and this vertical axis is horizontally offset from the horizontal wheel axle 27 (see FIG. 5). Therefore, front swivel wheels 26 are self-steering for enabling directional control of the shopping cart 20 (see FIG. 5a).

Figure 1:
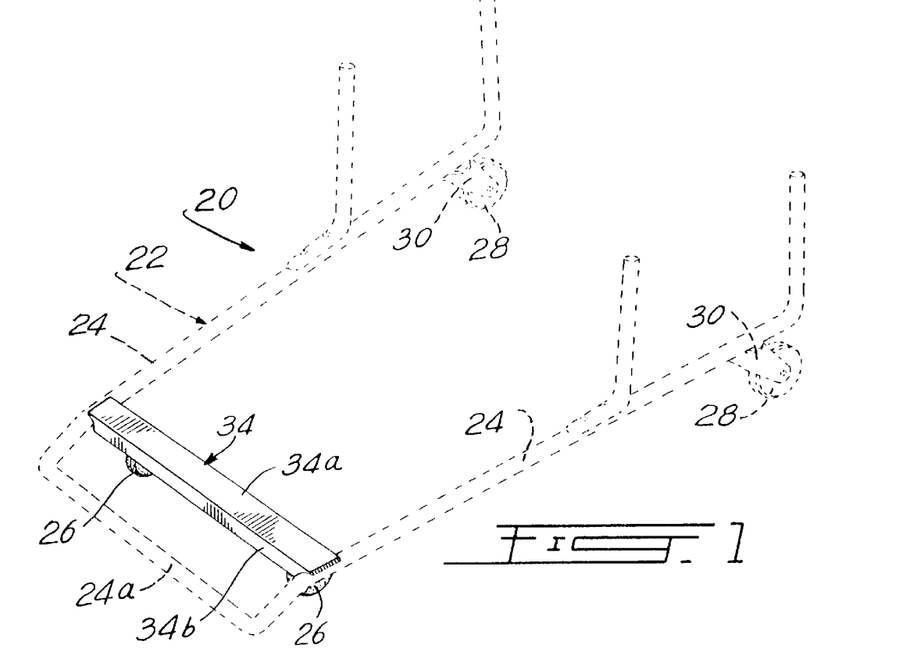
FIGS. 1 and 2 are perspective views of the underframe of a shopping cart, being provided with the first and second embodiments of swivel caster suspensions according to the invention, the cart underframe proper being illustrated in phantom lines.

In the present invention, the front swivel wheels 26 are not secured directly to the tubular legs 24 but are instead indirectly connected thereto via a transverse, elongated cross-member stud 34. As illustrated in FIGS. 1 and 3, the stud 34 is cross-sectionally U-shape, defining a horizontal web 34a and two flanges 34b on the front and rear long edges of the stud 34. The web 34a is longer than flanges 34b such that the remaining two other unflanged edges 34c of the stud 34 rest flatly over the two opposite side legs 24 of the shopping cart underframe. Each of the two end portions of each flange 34b is correspondingly notched, 34'b to accommodate the passage of the corresponding frame tubing 24. The stud edge portions 34c are anchored, e.g. by welding W, to the frame tubings 24. A bolt 36 and nut 38 mount each front wheel yoke 32 to a corresponding outer end of a pair of aligned elongated arms 40 and the conventional ball bearing assembly 32a of the swivel wheel 26 allows yoke 32 to rotate relative to the arm 40 about a vertical axis which is coaxial with bolt 36 and bearing 32a.

In accordance with the first—and preferred—embodiment of the invention, at FIGS. 3–4, there is disclosed a cylindrical shaft 42 that joins flanges 34b at a location close to web 34a and centrally of web edge portions 34c; shaft 44 has reduced ends 44 fitted within anchored aligned bores of these flanges 34b and is orthogonal thereto. A sleeve member 46 is rotatably mounted around fixed shaft 42, in between flanges 34b. Arm 40 are fixed by welding W to sleeve 46. Arms 40 are of equal length, are coplanar and extend in opposite directions from sleeve 46. More particularly, each arm 40 is a rectangular rigid plate, welded horizontally at its inner end at Wa to the tangential underface of sleeve 46, while its outer end carries by bolt 36 and nut 38 the top end of a corresponding swivel wheel 32. When arms 40 are parallel to cross-piece web 34a (FIG. 3), the top of the two bolts 36 clear the cross-piece web 34a by a gap P, preferably of approximately ¼ inch.

A walking beam is thereby formed by coplanar arms 40 pivot member 42, 46 and swivel wheels 26.

Figure 2:
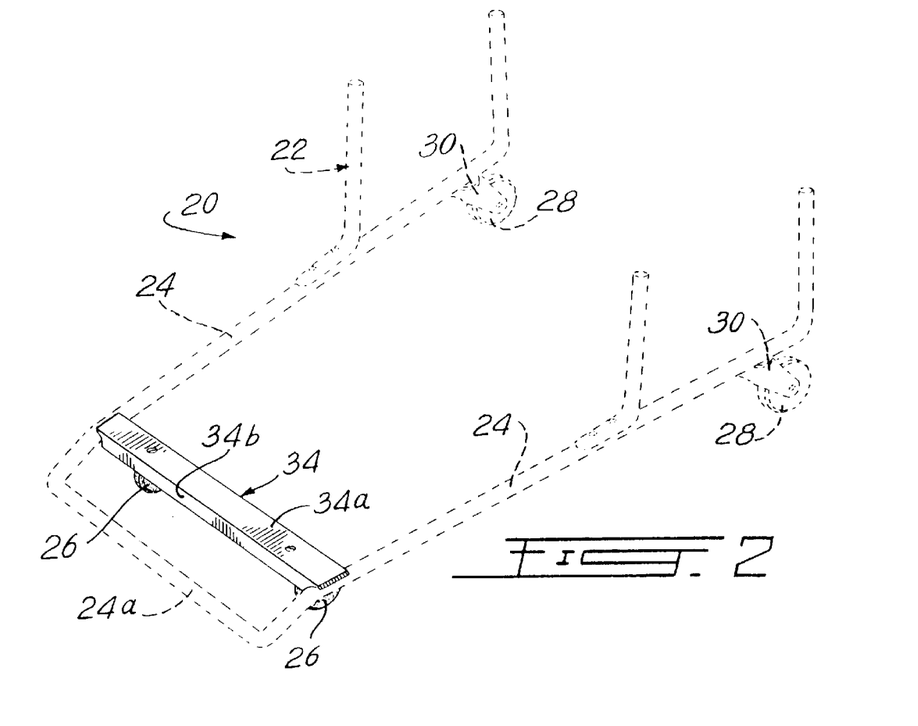
Figure 6:
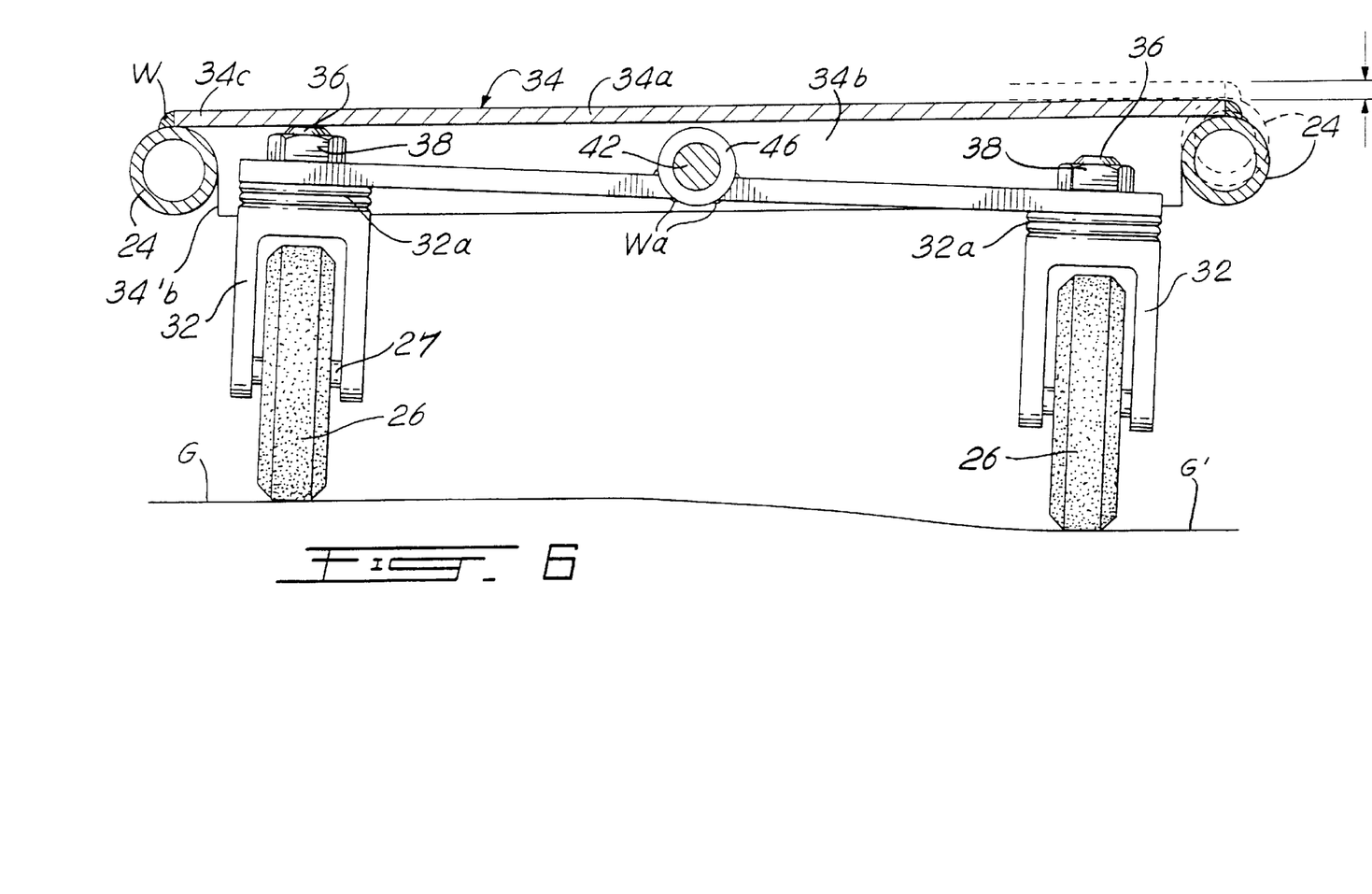
FIG. 6 is a view similar to FIG. 3, but showing the vertical play of the swivel wheels responsively to uneven terrain.

Hence, and as suggested in FIG. 6 of the drawings, should the shopping cart engage uneven terrain—i.e., should one swivel wheel, e.g. the right wheel 26 as illustrated, engage a ground section G' that is vertically downwardly offset relative to the main ground level G (onto which rolls the other swivel wheel 26)—, a tilting motion of the walking beam will follow, so as to keep both wheels 26 in contact with the ground G, G'. Concurrently, the wheel axles 27 also become inclined. This tilting motion will prevent undesirable "wobbling" of the swivel wheels 26 since both remain in full contact with the ground. However, lateral stability of the cart is maintained since the top of one of the two bolts 36 will abut the underface of web 34a when the ground trough encountered by the opposite swivel wheel 26 exceeds a predetermined vertical amount (FIG. 6). In other words, walking beam 48, 50 is prevented from from reaching a large angle relative to the horizontal plane and to the cross-piece or stud 34. Indeed, should the walking beam 40 be allowed to take an excessive angular tilt relative to the horizontal plane, say e.g. between 30 to 45 degrees, the centre of gravity of the shopping cart front end would shift laterally, thus introducing instability to the shopping cart whereby a condition could be created for accidental lateral overturning of the cart. For example, and as illustrated in FIGS. 2 and 4 for the level position of the front swivel wheels 26, the top of each bolt 36 are intersected by a horizontal plane which slightly clears the tangential top section of the shaft 44; such an arrangement provides a very good stability to the cart 20.

In the second and third embodiments of FIGS. 2, 7–9 and 1, 10–12, respectively, the walking beam FIGS. 1, 3 and 4, namely the unitary assembly of the two arms 40 and sleeve 46 is replaced by two lever arms 48, 50 which pivot independently from each other about common shaft 42. The inner ends of lever arms 48, 50 are respectively secured by welding Wb and Wc to interdigitating piano hinge sections 52 and 54, respectively, which surround shaft 42.

In the second embodiment of FIGS. 2, 7–9 a compression coil spring 58 is inserted between web 34a and each lever arm 48, 50 adjacent and inwardly of front swivel wheels 26 which are secured by bolts 36 and nuts 38 to the outer ends of the respective lever arms 48, 50. Each spring 58 surrounds and is guided by a bolt 60 which freely extends through web 34a and lever arm 48, 50. A nut 62 screwed on bolt 60 under lever arms 48, 50. Bolt head 64 retains bolt 60 to web 34a.

Under the load of cart 20, springs 58 are compressed and wheel bolts 36 abut against the underside of web 34a. In this position, abutment nuts 62 are spaced from the underside of lever arms 48, 50 as shown by gap Pa.

In their normal operating condition on even terrain G (full lines in FIG. 7), the lever arms 48, 50 therefore extend in coplanar horizontal fashion, and both bolts heads 36 directly abut against the underface of the cross-piece web 34a. Each coil spring 58 is compressed and exerts a downward force against its lever arm 48 or 50.

Figure 7:
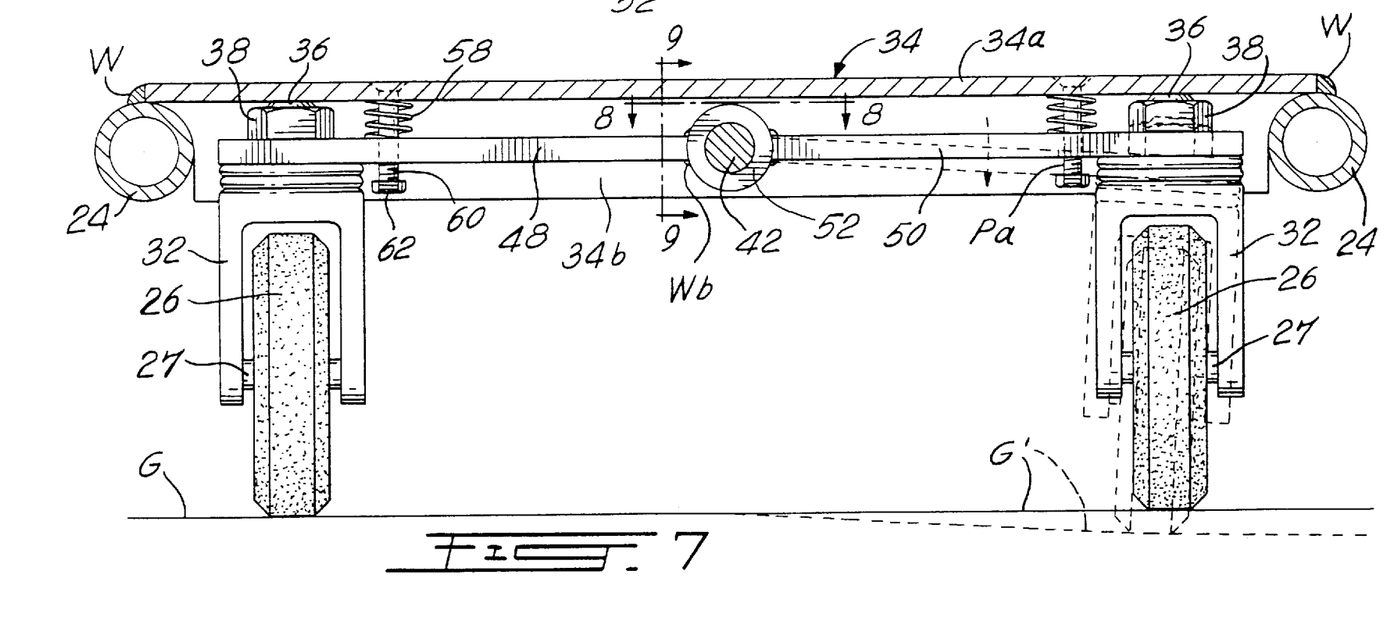
FIG. 7 is a view similar to FIG. 3, but for an alternate embodiment shown in FIG. 2, and showing in dotted lines the vertical play of one swivel wheel and of the pivotal arm carrying the wheel.
Figure 8:
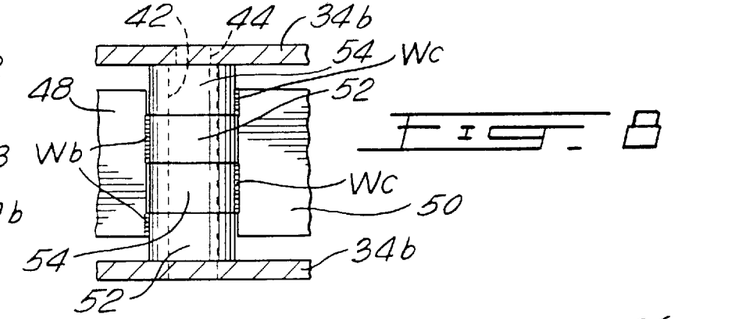
FIGS. 8 and 9 are a plan section and a cross-section taken along lines 8—8 and 9—9, respectively, of FIG. 7.
Figure 9:
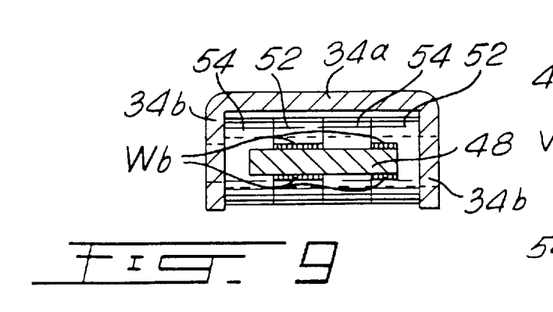

Either spring 58 will push down that one of the two wheels 26 which happens to ride over a floor depression G' as shown in FIG. 7. Accordingly, as in the first embodiment of the invention, by keeping the front swivel wheels 26 in constant engagement with the ground, undesirable wheel wobbling is prevented. Moreover, with this second embodiment, lateral stability of the cart is obtained since nuts 62 form stops to prevent excessive downward pivoting of lever arms 48, 50.

Figures 10, 11, 12:
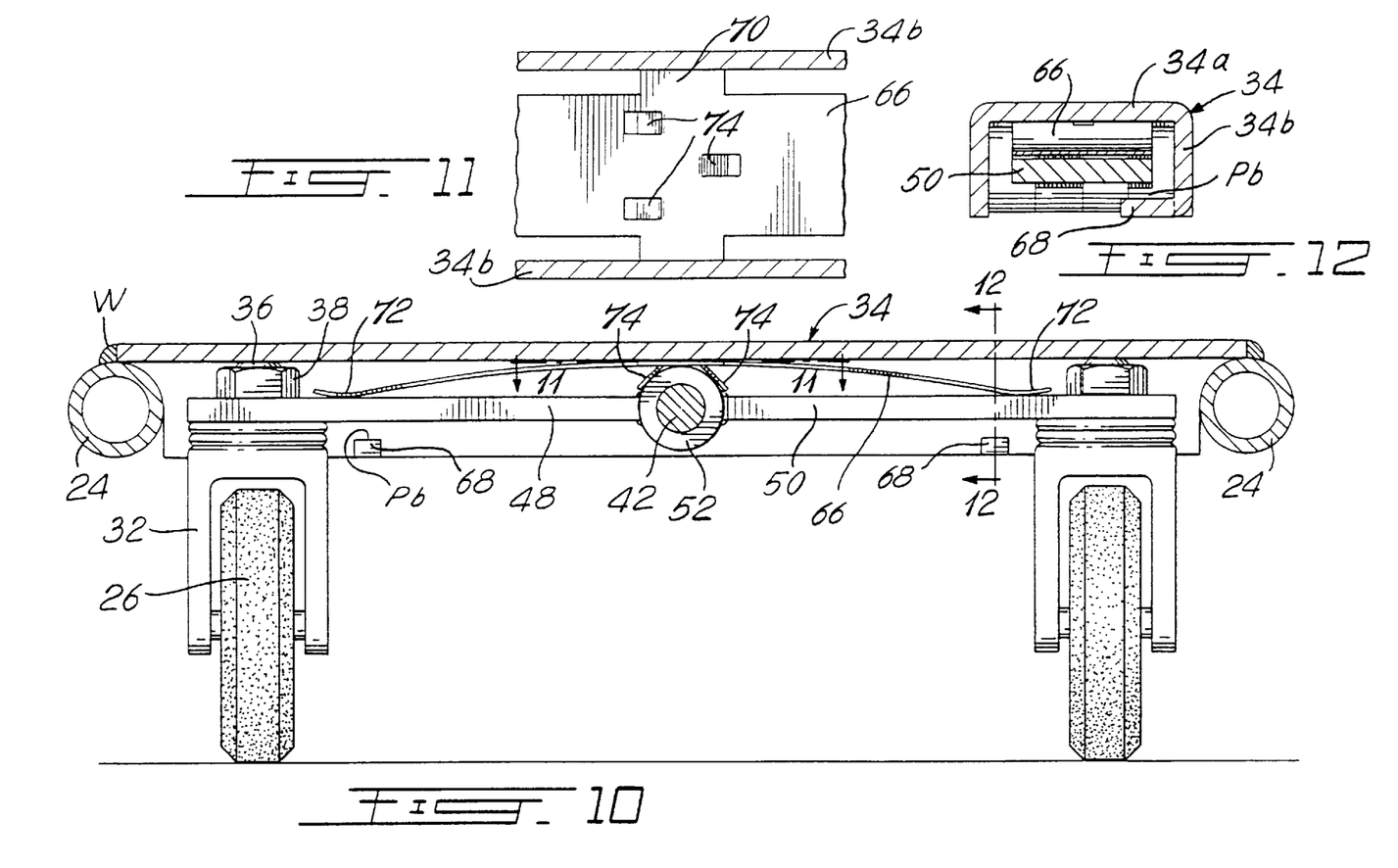
FIG. 10 is a view similar to FIG. 3, but for a third embodiment of the invention.
FIGS. 11 and 12 are a plan section and a cross-section taken along lines 11—11 and 12—12, respectively, of FIG. 10.

In the third embodiment of the invention, FIGS. 10, 12, the spring-loaded bolt and nut assemblies 58, 60, 62 are replaced by a leaf spring member 66, which is used for the same purpose. Leaf spring member 66 forms a generally rectangular metallic sheet, of upwardly convex bell-shape. Leaf spring 66 defines a central enlarged section 70 which is sandwiched between the underface of 34a and hinge sections 52, 54 which is edgewisely confined by flanges 34b. Leaf spring 66 has two opposite end portions 72 that slidingly engage the top surface of the corresponding lever arm 48 or 50.

Moreover, the underface of leaf spring central portion 70 carries a number of alternating, transverse, diverging tongues 74, that tangentially engage the upper portion of the cylindrical hinge sections 52, 54 so as to prevent accidental sliding displacement of the leaf spring 66 lengthwisely of lever arms 48, 50.

Stopper lips 68 project interiorly from the bottom edges of one of the stud flange 34b, adjacent and inwardly of the front swivel wheels 26. Stopper lips 68 are in vertical register with the corresponding lever arms 48, 50 at a gap Pb under the same when wheel bolts 36 abut the underside of web 34a. They prevent excessive downward pivoting of lever arms 48, 50 since they have the same function as nuts 62 of FIG. 7.

The second or the third embodiments of the invention, can be fitted both at the front and back of a cart if it is desired to fit such a cart with four swivel wheels 26.

We claim:

1. A swivel wheel anti-wobbling device for preventing swivel wheel wobbling of a cart over uneven terrain, the cart of the type including a rigid underframe to be directionally carried over ground by a pair of laterally opposite swivel wheels, for supporting one end of the cart and a pair of fixed wheel assemblies rigidly connected to the underframe at an opposite end of the cart said device comprising:

a rigid elongated cross-member, to be fixedly mounted to the cart under frame;

a rigid elongated arm member defining first and second opposite ends;

first mounting means for mounting said arm member intermediate said first and second ends thereof underneath and in alignment with said cross-member such that said arm member can rotate in a pivoting movement about a horizontal axis at said first mounting means;

springless limit means provided on said arm member and on said elongated cross-member and adapted to allow said arm member to freely rotate within a prescribed play and to interrupt said pivoting movement at limits of said prescribed play, whereby lateral stability of the cart is not compromised; and second mounting means for rotatably mounting the two swivel wheels to corresponding said opposite first and second ends of said elongated arm member; wherein said pivoting movement of said arm member is responsive to terrain irregularities while being limited by said limit means so as to limit vertical displacements of the swivel wheels and prevent the cart from becoming unstable.

2. A suspension device as defined in claim 1, wherein said cross-member includes a full web and two opposite downturned flanges, and said first mounting means includes a shaft, joining said cross-member flanges and extending beneath said web spacedly therefrom, and a sleeve member, rotatably mounted around said shaft and fixedly anchored to an intermediate section of said elongated arm member whereby said swivel wheels are concurrently movable in opposite directions under translational motion around said shaft, both said arm member opposite ends spacedly clearing said cross-member web upon said arm member extending generally parallel to said cross-member web.

3. A device as defined in claim 2, wherein said elongated arm member is anchored to said sleeve member about the sleeve member tangential lowermost section.

4. A device as defined in claim 3, wherein said limit means includes a pair of stopper members, integrally mounted to corresponding said arm member first and second ends at a location opposite said swivel wheels, and abuttingly engageable with said cross-member web in alternating fashion upon said translational motion of the swivel wheels being brought by terrain condition.

5. A suspension device for preventing swivel wheel wobbling of a cart over uneven terrain, said cart of the type including a rigid underframe to be directionally carried over ground by a pair of laterally opposite swivel wheels, said suspension device consisting of:

a rigid elongated cross-member, to be fixedly mounted to said cart under frame, including a full web and two opposite downturned flanges;

an elongated arm member, defining first and second opposite ends and consisting of pair of elongated lever arms each defining an outer end and an opposite inner end, the outer ends of both lever arms defining said first and second ends of said arm member;

first mounting means, mounting said arm member underneath and in alignment with said cross-member for relative movement thereabout of said first and second ends thereof, said first mounting means including a shaft, therefrom, and a hinge member, rotatably mounted around said shaft and defining first and second hinge parts fixedly mounted to corresponding first and second lever arm inner ends whereby each said lever arm is freely movable relative to the other said lever arm;

limit means, to restrain within a prescribed play said relative movement of said arm member first and second ends, whereby lateral stability of the cart is not compromised; and second mounting means, for rotatably mounting the two swivel wheels to corresponding said opposite first and second ends of said elongated arm member;

wherein said relative movement of the arm member first and second ends is responsive to terrain irregularities, to keep both swivel wheels in constant contact with the terrain;

said swivel wheels thus being able to enter into independent vertical motion around said shaft, the outer ends of said lever arms including corresponding abutment members, at a location opposite the corresponding said swivel wheels, both said abutment members, in an upper limit position of said lever arms, continuously abuttingly engaging said cross-member web under load from the cart over even terrain; and further including biasing means, biasing each said lever arm downwardly away from said cross-member web and said limit means includes a pair of stopper means carried by said web and spacedly extending under said lever arms when in said upper limit position.

6. A suspension device as defined in claim 5, wherein said biasing means includes a pair of coil springs, extending between said cross-member web and the corresponding lever arms at a location proximate the corresponding said outer ends thereof, and means to maintain such positioning of said coil springs between said cross-member web and said lever arms.

7. A suspension device as defined in claim 5, wherein said biasing means consists of a leaf spring member, extending between said cross-member web and said lever arms, said leaf spring member defining two opposite end portions located proximate the corresponding outer ends of said lever arms and engaging same, and a central section engaging the underface of said cross-member web.

8. A suspension device as defined in claim 7, wherein said limit means consists of stopper lips, edgewisely inwardly carried by at least one of said cross-member flanges and extending beneath said cross-member web and transversely engageable by a corresponding said lever arm in a lowered limit position of the corresponding lever arm.

9. A suspension device as defined in claim 8, wherein said leaf spring member further includes tongue elements, downwardly projecting from said central section thereof and engaging said hinge member, said tongue elements for preventing accidental sliding motion of said leaf spring member lengthwisely along the corresponding said lever arms.

* * * * *